(12) United States Patent
Salinas

(10) Patent No.: US 10,003,113 B1
(45) Date of Patent: Jun. 19, 2018

(54) FASTENING ASSEMBLY AND METHOD

(71) Applicant: Ford Global Technologies, LLC, Dearborn, MI (US)

(72) Inventor: Fernando Cesar Salinas, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/383,182

(22) Filed: Dec. 19, 2016

(51) Int. Cl.
*H01M 10/65* (2014.01)
*F16B 43/00* (2006.01)
*H01M 2/10* (2006.01)
*H01M 10/6563* (2014.01)
*H01M 10/613* (2014.01)
*H01M 10/625* (2014.01)

(52) U.S. Cl.
CPC ....... *H01M 10/6563* (2015.04); *F16B 43/001* (2013.01); *H01M 2/1077* (2013.01); *H01M 10/613* (2015.04); *H01M 10/625* (2015.04)

(58) Field of Classification Search
CPC ......... H01L 2924/0002; H01L 2924/00; H01L 27/14618; H01L 27/14625; F04B 15/08; F04B 2205/03; F04B 2205/05; B60R 11/04; H01M 10/0413; H01M 10/613; H01M 10/625; H01M 10/647; H01M 10/6556; H01M 2200/103; H01M 10/6563; H01M 2/1077; F16B 43/001
See application file for complete search history.

(56) References Cited

U.S. PATENT DOCUMENTS

| | | | | |
|---|---|---|---|---|
| 4,283,091 A | * | 8/1981 | Enders | B60B 3/165 301/35.622 |
| 5,205,472 A | * | 4/1993 | Sullivan | F24F 1/0007 220/571 |
| 5,419,606 A | | 5/1995 | Hull et al. | |
| 5,704,749 A | * | 1/1998 | Landgrebe | F16B 5/025 411/339 |
| 6,101,096 A | * | 8/2000 | MacGregor | H05K 7/142 165/104.34 |
| 6,241,444 B1 | * | 6/2001 | Clarke | F16B 35/048 411/160 |

(Continued)

FOREIGN PATENT DOCUMENTS

| | | |
|---|---|---|
| EP | 3073128 | 9/2016 |
| FR | 2673249 | 8/1992 |
| GB | 2264151 | 8/1993 |

OTHER PUBLICATIONS

Minnesota Rubber & Plastics, Quadion LLC, How Overmolding Improves Product Performance, retrieved on Oct. 20, 2016 from http://www.mnrubbercom/News/How_Overmolding_Improves_Product_Performance.html.

*Primary Examiner* — Adam B Dravininkas
(74) *Attorney, Agent, or Firm* — Carlson, Gaskey & Olds, P.C.

(57) ABSTRACT

An exemplary fastening assembly includes a washer having a washer bore to receive a shank of a fastener, and a gasket secured about a radially outer perimeter of the washer. The gasket has an opening that is larger than a head of the fastener such that the gasket is radially spaced from the fastener when the shank is received within the washer bore. An exemplary fastening method includes pulling a gasket of a fastening device against a first component when securing the first component to a second component without clamping the gasket.

18 Claims, 5 Drawing Sheets

(56) References Cited

U.S. PATENT DOCUMENTS

| | | | |
|---|---|---|---|
| 9,435,365 B2 | 9/2016 | Orlando et al. | |
| 2006/0263172 A1* | 11/2006 | Bassani | F16B 43/00 |
| | | | 411/546 |
| 2009/0186266 A1* | 7/2009 | Nishino | B60K 1/04 |
| | | | 429/120 |
| 2009/0197154 A1* | 8/2009 | Takasaki | B60K 1/04 |
| | | | 429/83 |
| 2010/0143076 A1* | 6/2010 | Matsumoto | F16B 43/001 |
| | | | 411/533 |
| 2015/0247524 A1* | 9/2015 | Utsuno | F16B 43/001 |
| | | | 411/542 |

* cited by examiner

FASTENING ASSEMBLY AND METHOD

TECHNICAL FIELD

This disclosure relates generally to a fastening assembly and, more particularly, but not exclusively, to a fastening assembly used to seal and secure components of a fan that moves a flow of air through a traction battery pack.

BACKGROUND

Electrified vehicles differ from conventional motor vehicles because, among other things, electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The traction battery can be used to selectively power the electric machines and other electrical loads of the electrified vehicle. The traction battery includes a plurality of interconnected battery cells that store energy for powering these electrical loads. Some electrified vehicles include one or more fans that direct a flow of air through portions of the traction battery. The flow of air can help to manage thermal energy levels within the traction battery.

SUMMARY

A fastening assembly according to an exemplary aspect of the present disclosure includes, among other things, a washer having a washer bore to receive a shank of a fastener, and a gasket secured about a radially outer perimeter of the washer. The gasket has an opening that is larger than a head of the fastener such that the gasket is spaced radially from the fastener when the shank is received within the washer bore.

A further non-limiting embodiment of any of the foregoing assemblies includes the fastener in a secured position where the fastener extends through the washer bore to secure a first component to a second component. The washer is clamped between the head of the fastener and the first component when the fastener is in the secured position. The gasket is unclamped.

A further non-limiting embodiment of any of the foregoing assemblies includes the gasket overmolded to the washer.

In a further non-limiting embodiment of any of the foregoing assemblies, the gasket has a material composition that is compressible relative to a material composition of the washer.

A further non-limiting embodiment of any of the foregoing assemblies includes the fastener in a secured position where the fastener extends through the washer bore to secure a first component to a second component. The gasket provides an annular groove that receives a boss extending from the first component when the fastener is in the secured position.

A further non-limiting embodiment of any of the foregoing assemblies includes a fan assembly configured to move a flow of air through a battery pack of an electrified vehicle. The fan assembly includes a housing assembly and internal components housed within the interior. The fastener is in a secured position that secures a first component of the housing assembly to at least one of the internal components.

A further non-limiting embodiment of any of the foregoing assemblies includes the internal component as a printed circuit board of a fan motor.

In a further non-limiting embodiment of any of the foregoing assemblies, the gasket is in a sealed position when the fastener is in a secured position.

In a further non-limiting embodiment of any of the foregoing assemblies, the gasket in the sealed position is biased against a first component that is secured by the fastener to a second component when the fastener is in the secured position.

A further non-limiting embodiment of any of the foregoing assemblies includes the fastener in a secured position where the fastener secures a first component to a second component, and where a boss of the washer that is received within an aperture of the first component.

A further non-limiting embodiment of any of the foregoing assemblies includes a primary portion of the washer secured directly to the gasket. The boss extends from the primary portion.

A further non-limiting embodiment of any of the foregoing assemblies includes a boss of the second component received within the aperture of the first component and directly contacting the boss of the washer.

A further non-limiting embodiment of any of the foregoing assemblies includes radially extending fingers of the second component. The radially extending fingers are clamped between the washer and the first component.

A fastening method according to another exemplary aspect of the present disclosure includes, among other things, pulling a gasket of a fastening device against a first component when securing the first component to a second component without clamping the gasket.

A further non-limiting embodiment of the foregoing method includes clamping a washer of the fastening device against a component during the pulling.

A further non-limiting embodiment of the foregoing method includes pulling the gasket by clamping a washer of the fastening device between a fastener and the first component.

A further non-limiting embodiment of the foregoing method includes securing the first component to the second component with a fastener extending through a bore in a washer. The gasket is overmolded onto the washer.

A further non-limiting embodiment of the foregoing method includes compressing an overmolded portion of the first component during the securing.

In a further non-limiting embodiment of the foregoing method, the method includes the first component as part of a housing assembly of a fan assembly. The second component is an internal component housed within an interior of the housing assembly.

A further non-limiting embodiment of the foregoing method includes moving a flow of air through a battery pack of an electrified vehicle using the fan assembly.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure is directed toward a fastening assembly that can, in some non-limiting embodiments, be used to secure components of a fan assembly that moves a flow of air through a traction battery of an electrified vehicle. The assembly includes a fastening device incorporating features that block, among other things, water entering an interior of the fan assembly. Water can corrode components within the interior of the fan assembly. These and other features are discussed in greater detail in the following paragraphs of this detailed description.

Figure 1:
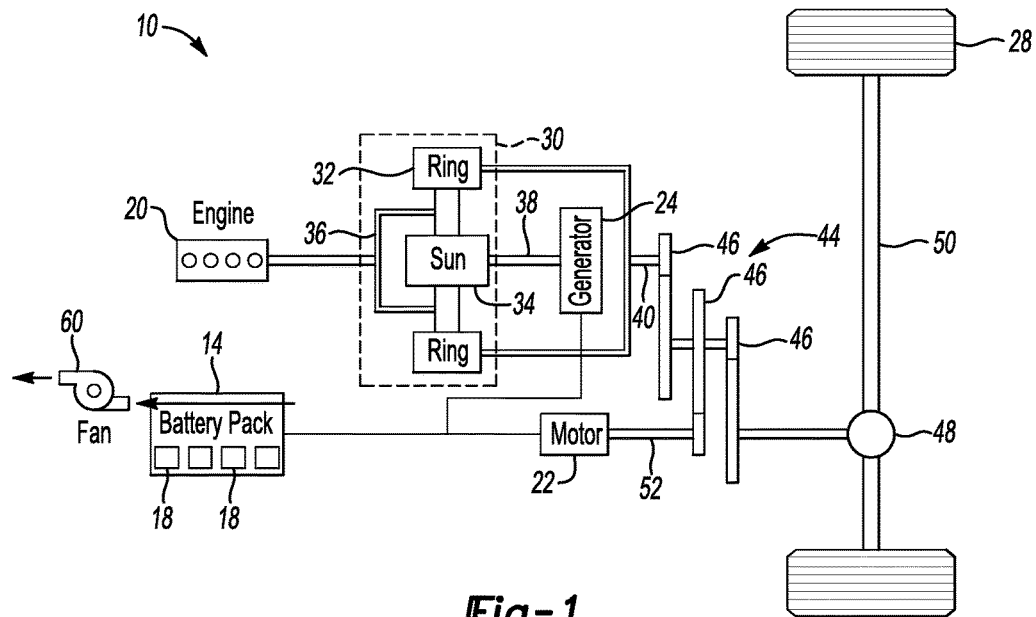
FIG. 1 illustrates a schematic view of an example powertrain for an electrified vehicle.

FIG. 1 schematically illustrates a powertrain 10 for an electrified vehicle. Although depicted as a hybrid electric vehicle (HEV), it should be understood that the concepts described herein are not limited to HEVs and could extend to any other types of conventional vehicles and electrified vehicle, including, but not limited to, plug-in hybrid electric vehicles (PHEVs), battery electric vehicles (BEVs), etc.

The concepts described herein are also not limited to fans or vehicles. That is, the teachings of this disclosure could apply to fastening devices used for connecting various components, especially where sealing an interface associated with the fastening device is desired.

The powertrain 10 of the example electrified vehicle includes a battery pack 14 having a plurality of battery arrays 18, an internal combustion engine 20, a motor 22, and a generator 24. The motor 22 and the generator 24 are types of electric machines. The motor 22 and generator 24 may be separate or have the form of a combined motor-generator.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the battery pack 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 52 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the battery pack 14.

Thermal management of the battery pack 14 can facilitate, among other things, efficient operation of the battery pack 14 and the remaining portions of the powertrain 10. A fan assembly 60 is associated with the example battery pack 14 and used to manage thermal energy. The fan assembly 60, in this example, draws a flow of air from the cabin through a portion of the battery pack 14. The flow moves from the portion of the battery pack 14 to the fan assembly 60 and is then exhausted to an exterior of the vehicle. Although the example embodiment is shown as exhausting flow from the fan assembly 60 to an exterior of the vehicle, other examples could exhaust the flow to other areas, such as an interior of the vehicle, but without recirculating the flow directly to the battery pack 14.

In some examples, the flow of air moved by the fan assembly 60 cools the battery pack 14. In other examples, the flow of air heats the battery pack 14.

Figure 2:
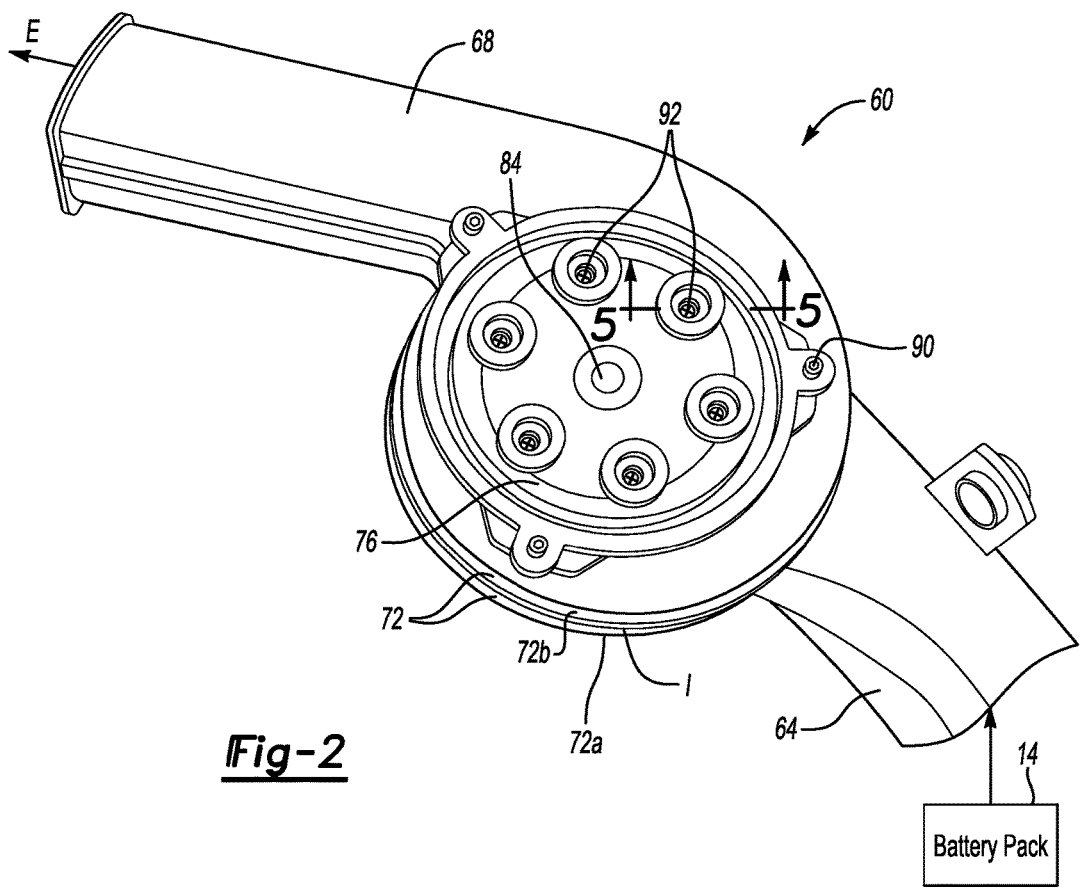
FIG. 2 illustrates a perspective view of a fan assembly used in connection with a battery pack from the powertrain of FIG. 1.
Figure 3:
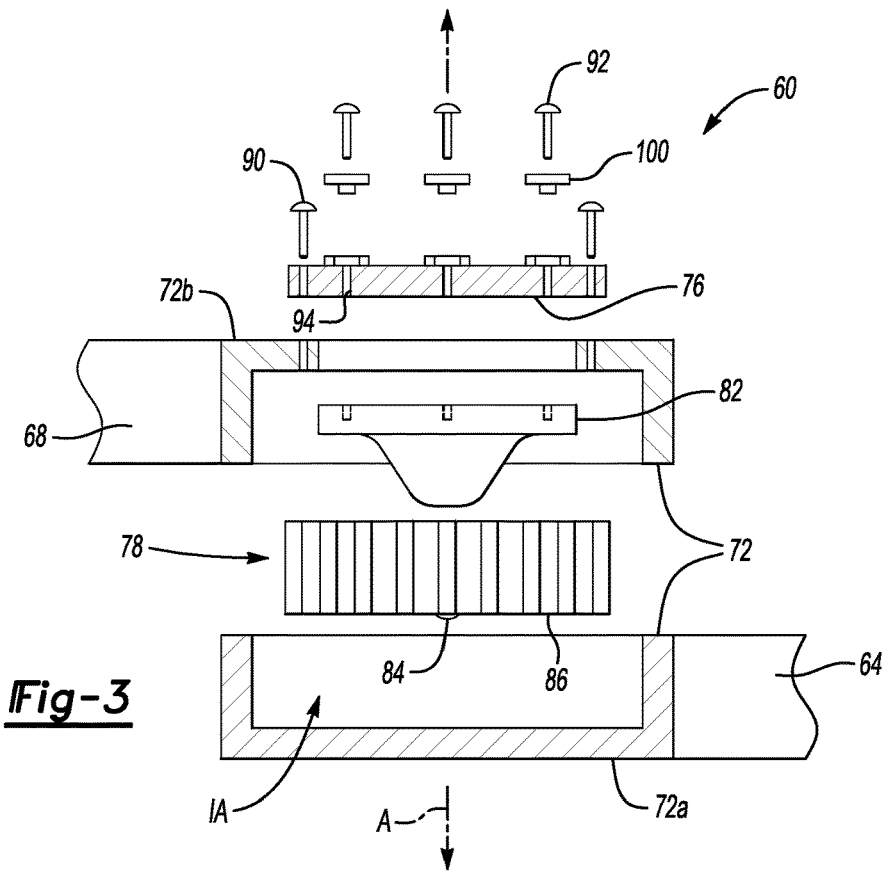
FIG. 3 illustrates a schematic section and expanded view of the fan of FIG. 2.
Figure 4:
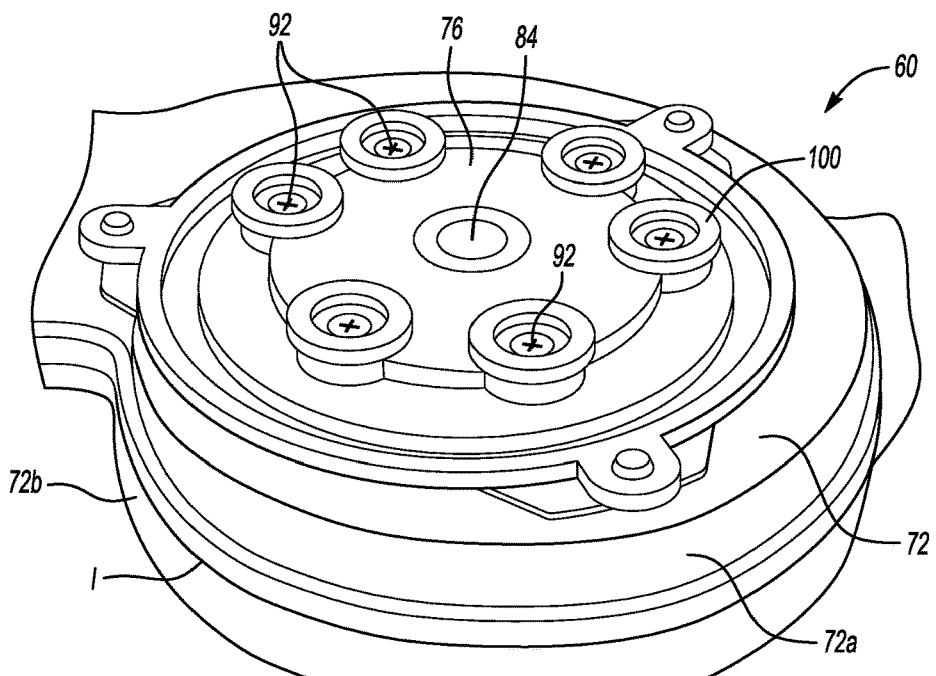
FIG. 4 illustrates a close-up view of the fan assembly of FIG. 2 showing a housing cover secured to a housing body.

Referring now to FIGS. 2 to 4, with continuing reference to FIG. 1, the fan assembly 60 is connected to an input conduit 64 and an exhaust conduit 68. The flow of air moves through the input conduit 64 from the battery pack 14 to the fan assembly 60. The flow of air moves through the exhaust conduit 68 from the fan assembly 60. The flow of air is exhausted from the exhaust conduit 68 to an exterior E of the vehicle.

The fan assembly 60, according to an exemplary non-limiting embodiment, includes a housing assembly having a housing body 72 and a housing cover 76. The housing assembly holds a plurality of internal components 78. The housing body 72 and the housing cover 76 provide an interior area IA that hold the internal components 78.

The internal components 78 can include, but are not limited to, a motor 82, a shaft 84, and an impeller 86. Among other things, the motor 82 can include magnets, a shaft, stack laminations, and a printed circuit board.

The motor 82 can be powered to rotate the impeller 86 via the shaft 84 about an axis A. The rotation of the impeller 86 draws the flow of air through the input conduit 64 and expels the flow through the exhaust conduit 68.

In some examples, the housing body 72 includes a first portion 72a formed together with the input conduit 64 and a second portion 72b formed together with the exhaust conduit 68. The first portion 72a is snapped together with the second portion 72b. The first portion 72a and the second portion 72b meet at an interface I when snapped together.

The housing body 72 and the housing cover 76 can be formed of a polymer-based material, such as a polypropylene with a 20% talc fill or 30% glass fill.

Fasteners 90 secure the housing cover 76 to the housing body 72. In this example, the housing cover 76 is secured to the first portion 72a of the housing body 72 with the fasteners 90.

In this example, the fan assembly 60 additionally includes a plurality of fasteners 92 circumferentially distributed about the axis A of the shaft 84. The fasteners 92 extend through apertures 94 in the housing cover 76 to engage and secure at least some of the internal components of the fan assembly 60. In this non-limiting embodiment, the fasteners 92 secure the motor 82 of the fan assembly 60 to the housing cover 76, and, more specifically, secure a printed circuit board of the motor 82 to the housing cover 76. Six of the fasteners 92 are used in this example.

Although shown as extending through the housing cover 76, the fasteners 92 could instead, or additionally, extend through apertures in the housing body 72 to secure the internal components of the fan assembly 60.

As can be appreciated, the apertures 94 within the housing cover 76 can provide passageways for water and contaminants to enter the interior area IA of the fan assembly 60, which is undesirable. The example fasteners 92 thus extend through a fastening device 100 incorporating features to block passage of moisture and other contaminants into the interior area IA of the fan assembly 60.

Figure 5:
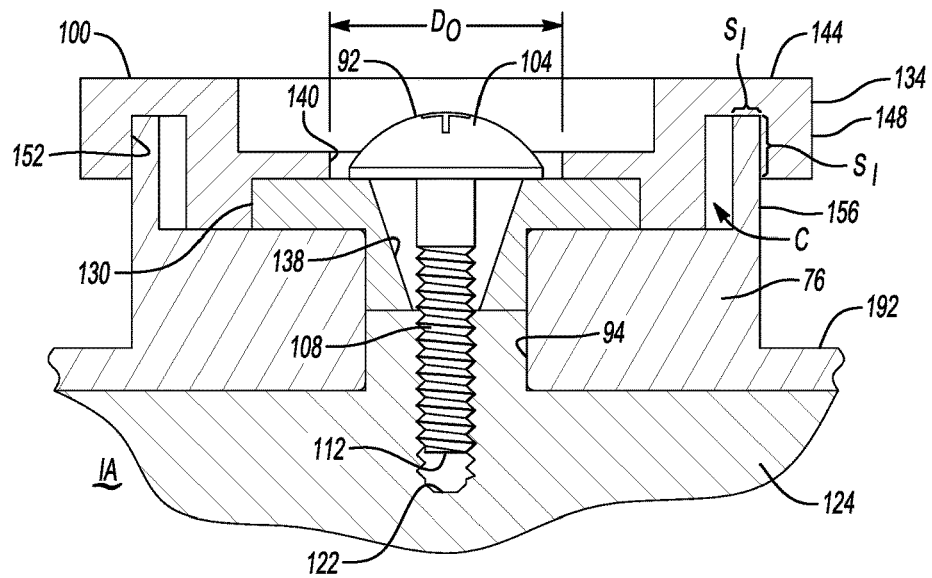
FIG. 5 illustrates a section view at Line 5-5 in FIG. 2 with a fastener in a secured position to secure the housing cover to the housing body.
Figure 6:
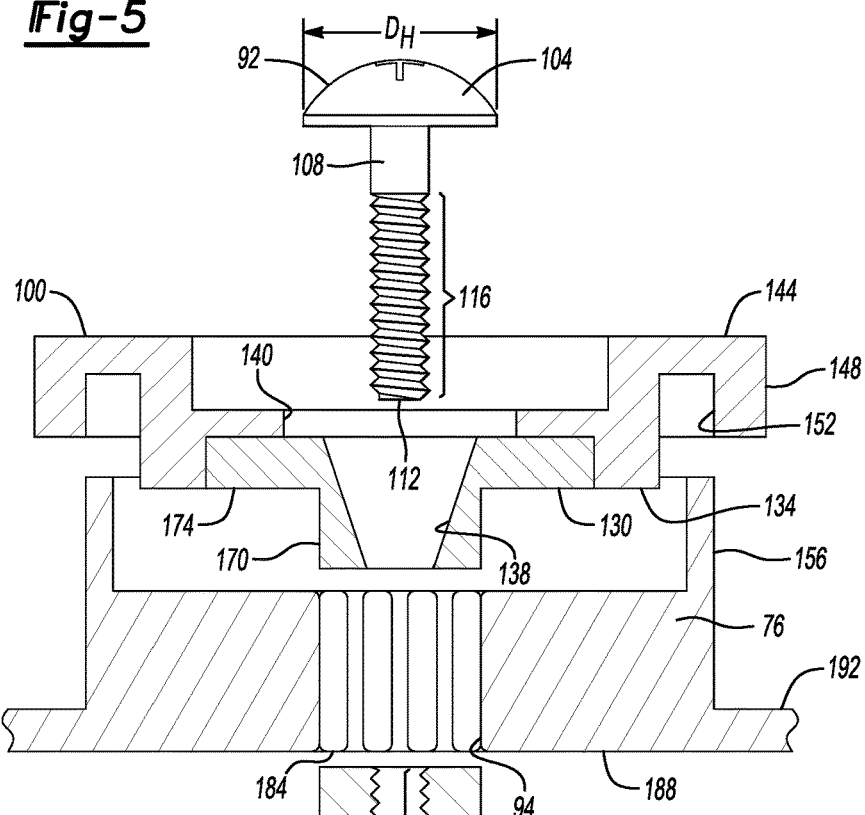
FIG. 6 illustrates an expanded view of the section of FIG. 5.

Referring now to FIGS. 5 and 6, the fasteners 92 include a head 104 and a shank 108 extending from the head 104 to a tip portion 112. The fasteners 92 are threaded fasteners in this example. The shank 108 of the fasteners 92 thus includes a threaded portion 116.

When the fastener 92 is in a secured position (FIG. 5), the threaded portion 116 threadably engages a corresponding threaded portion 120 provided within a bore 122 of an internal component 124 of the fan assembly 60. As previously described in connection with FIG. 2, the internal component 124 is a printed circuit board of the motor 82 in this example. Other examples could secure the fastener 92 to some other internal component.

When the fastener 92 is in the secured position, the fastener 92 secures the internal component 124 to the housing cover 76 of the fan assembly 60. Put another way, the fastener 92 in the secured position, secures a first component, here the housing cover 76, to a second component, here the internal component 124.

Figure 7:
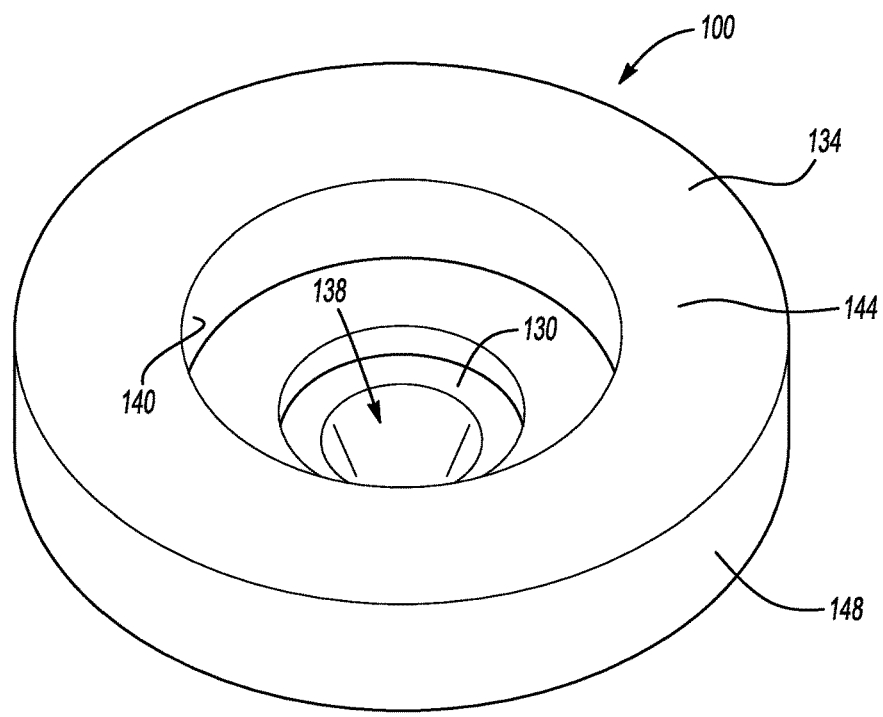
FIG. 7 illustrates a perspective view showing a Class A surface of a fastening device used to secure an internal component of the fan assembly to the housing cover of the fan.
Figure 8:
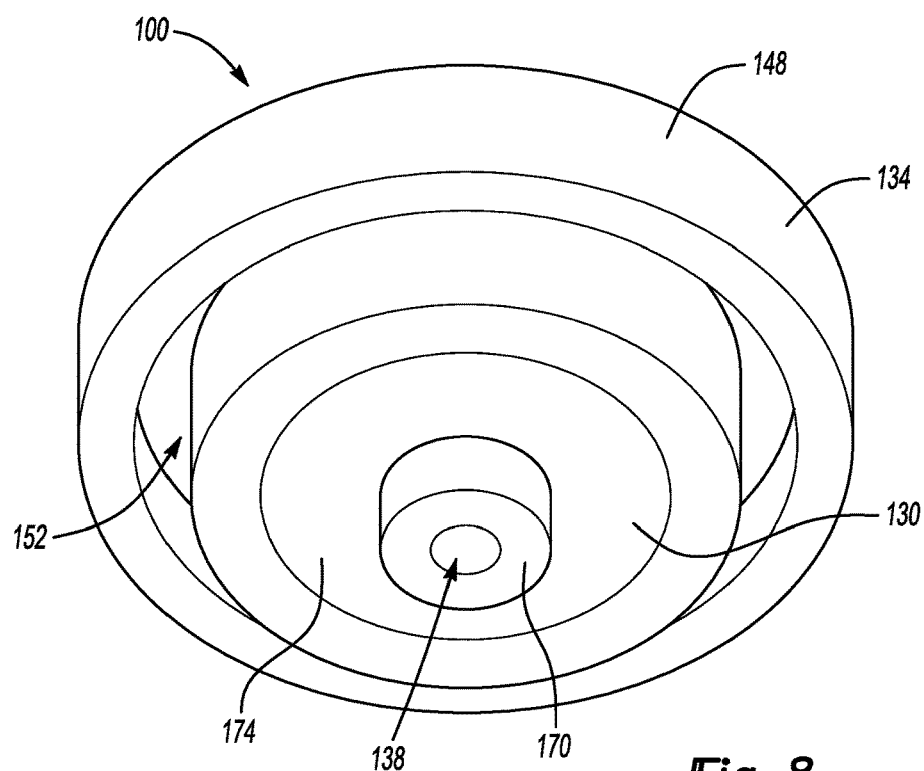
FIG. 8 illustrates another perspective view of the fastening device of FIG. 7 showing a Class B surface.

Referring now to FIGS. 7 and 8, with continuing reference to FIGS. 5 and 6, the fastening device 100 includes a washer 130 and a gasket 134. The washer 130 provides a washer bore 138 that receives the shank 108 of the fastener 92 when the fastener 92 is in the secured position. The washer bore 138 permits the fastener 92 to extend through the fastening device 100.

The gasket 134 is secured about a radially outer perimeter of the washer 130. The gasket 134 includes an opening 140 that, in this example, receives the head 104 of the fastener 92 when the fastener 92 is in the secured position. Notably, the opening 140 has a diameter $D_O$ that is greater than a diameter $D_H$ of the head 104 of the fastener 92.

When the fastener 92 is in the secured position, the head 104 of the fastener 92 clamps the washer 130 of the fastening device 100 axially against the housing cover 76.

Because the diameter of the opening $D_O$ in the gasket 134 is greater than the diameter $D_H$ of the head 104, the gasket 134 is unclamped by the fastener 92 when the fastener 92 is in the secured position.

The washer 130 has a first material composition, and the gasket 134 has a second material composition that is more compressible than the first material composition of the gasket 134.

In some non-limiting examples, the washer 130 is a polymer-based material, such as a polypropylene containing a 20% talc fill or 30% glass fill. Other example materials for the washer 130 could be a polypropylene with a 20% glass fill, or Acrylonitrile Butadiene Styrene (ABS), nylon (PA66), etc. The gasket 134 can be an ethylene propylene diene monomer (EPDM) rubber material, which, as can be appreciated, is relatively soft when compared to a polypropylene-based material. In particular, the Shore A hardness of the gasket 134 can be from 40-90. In some examples, the gasket 134 can be any material having Shore A hardness of about 50, and the washer 130 can be any material having a Shore D hardness that is greater than or equal to 70.

In some examples, the gasket 134 can be overmolded onto the washer 130. The gasket 134 is thus directly connected to the washer 130.

The gasket 134 includes a flange 144 extending radially from the opening 140. The gasket 134 further includes a flange 148 extending axially from the flange 144. The flange 144 and the flange 148 establish an annular groove 152 within the gasket 134.

When the fastener 92 is in the secured position of FIG. 4, the annular groove 152 receives an housing cover boss 156 extending axially from the housing cover 76. When the fastener 92 is in the secured position, the clamping force on the washer 130 pulls the annular groove 152 of the gasket 134 against the housing cover boss 156. When the fastener 92 is in the secured position, the gasket 134 is in a sealed position where a portion of the gasket 134 is pulled, or biased, against the housing cover boss 156.

In the sealed position of the exemplary embodiment, the housing cover boss 156 and the flanges 144 and 148 of the gasket 134 contact each other to establish a sealed interface $S_I$, which can block moisture and contaminants from entering the interior area IA of the fan assembly 60.

In the past, washers used in connection with a fastener were metallic and lacked a gasket. Thus, moisture and other contaminants could potentially enter an interior area of a fan through passages between the metal washer and a housing of the fan, particularly at the radial outer areas of the washer.

The annular groove 152 can, in some examples, be configured and formed such that a radially outermost diameter of the annular groove 152 generally matches an outermost diameter of the housing cover boss 156. Matching these diameters can facilitate a line to line contact between the axially extending flange 148 and a radially outer surface of the housing cover boss 156, which can further facilitate establishing at least a portion of the sealed interface $S_I$.

In some examples, the axially extending flange 148 extends from the radially extending flange 144 all the way to the housing cover 76. The flange 144 could be configured to extend to the housing cover 76 but be spaced 0.05 millimeters from the base 76, for example, to accommodate assembly variations. Lengthening the axially extending flange 148 can increase the length of the sealed interface $S_I$, which can enhance the blocking of water and contaminates.

The annular groove 152 can, in some examples, be configured and formed such that a radially innermost diameter of the annular groove 152 is less than an outermost diameter of the housing cover boss 156. This provides clearance C between the gasket 134 and the housing cover boss 156. The clearance C can facilitate axial movement of the fastening device 100 as the fastener 92 is secured.

The washer 130 includes a washer boss 170 extending from a primary portion 174 of the washer 130. The primary portion 174 directly contacts the housing cover 76 when the fastener 92 is in the secured position. The primary portion 174 of the washer 130 distributes clamp loads through the washer 130 to the housing cover 76.

When the fastener 92 is in the secured position, the washer boss 170 extends into the aperture 94 of the housing cover 76. The washer boss 170 can facilitate locating the fastening device 100 when moving the fastener 92 to the secured position.

The washer bore 138 of the washer 130 extends through the primary portion 174 and the washer boss 170. In this example, the washer bore 138 has a frustoconical shape tapering from the primary portion 174 to the axial end of the washer boss 170. The frustoconical shape of the washer bore 138 facilitates insertion of the fastener 92 into the washer bore 138 during assembly, and alignment of the fastener 92 to the bore 122 in the internal component 124.

Figure 9:
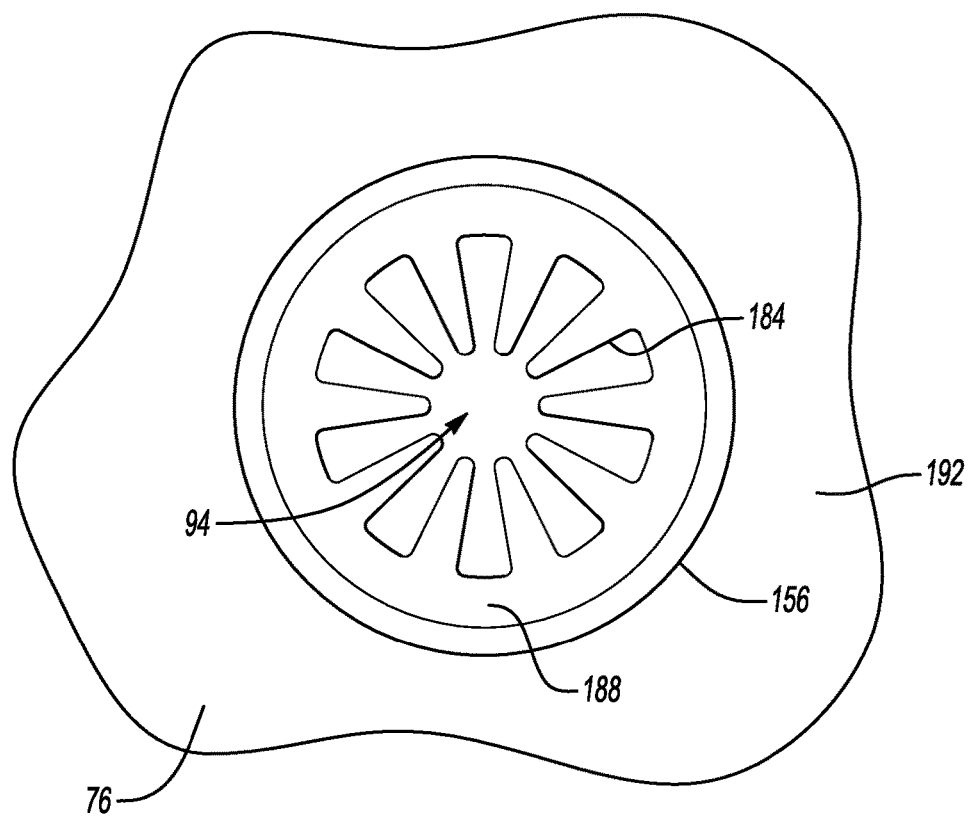
FIG. 9 illustrates a top view of a housing cover of the fan.

Referring now to FIG. 9, with continuing reference to FIGS. 5 and 6, the aperture 94 in the housing cover 76 is established, in this example, by a plurality of radially extending fingers 184 distributed about the aperture 94. The fingers 184 can extend from a ring 188 of the housing cover 76.

In this example, the ring 188 and the fingers 184 are formed together as an overmolded structure of the housing cover 76. That is, the ring 188 and the fingers 184 can be overmolded into a primary portion 192 of the housing cover 76, and can have a material composition that is different than a material composition of the primary portion 192.

Like the housing body 72 (FIG. 3), the primary portion 192 over the housing cover 76 can be made of a polymer-based material, such as a polypropylene containing a 20% talc fill or 30% glass fill. The ring 188 and the fingers 184, in contrast to the primary portion 192 of the housing cover 76, can be formed from another polymer material that is softer than the material of the primary portion 192. The material composition of the ring 188 and the fingers 184 could include rubber.

The ring 188 and the fingers 184 are thus relatively compressible when compared to the primary portions 192 of the housing cover 76. When the fastener 92 is in the secured position, the clamping of the washer 130 against the fingers 184 of the housing cover 76 compresses the fingers 184, and potentially the ring 188, axially against the internal components 124. Compression of the relatively soft fingers 184 and ring 188 can mitigate noise, vibration, and harshness issues associated with movement of the internal components 124 relative to the housing cover 76.

The aperture 94, in this example, receives an internal component boss 156 extending from the internal component 124 in addition to the gasket boss 170 of the washer 130. When the fastener 92 is in the secured position, the gasket boss 170 of the washer 130 directly contacts the internal component boss 156 of the internal component 124. In so doing, the positioning and spacing of the internal component 124 relative to the housing cover 76 can be controlled.

Alternatively, the gasket boss 170 could be designed such that the gasket boss 170 is axially spaced from the internal component boss 156 of the internal component 124 when the fastener 92 is in the secured position.

Features of the disclosed examples include a fastening device incorporating a relatively soft gasket that can block potential leak passages to an interior of a fan assembly. The relatively soft gasket is not clamped between a fastener and another component. The relatively soft gasket thus does not interfere with clamp loads associated with the fastener, which could result in looseness when the fastener is in a secured position.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A fastening assembly, comprising:
a fastener in a secured position where the fastener extends through a washer bore to secure a first component to a second component;
a washer having the washer bore to receive a shank of the fastener; and
a gasket secured about a radially outer perimeter of the washer, the gasket having an opening that is larger than a head of the fastener such that the gasket is spaced radially from the fastener when the shank is received within the washer bore, the gasket providing an annular groove that receives a boss extending from the first component when the fastener is in the secured position.

2. The fastening assembly of claim 1, wherein the washer is clamped between the head of the fastener and the first component when the fastener is in the secured position, the gasket unclamped.

3. The fastening assembly of claim 1, wherein the gasket is overmolded to the washer.

4. The fastening assembly of claim 1, wherein the gasket has a material composition that is compressible relative to a material composition of the washer.

5. The fastening assembly of claim 1, wherein the gasket is in a sealed position when the fastener is in a secured position.

6. The fastening assembly of claim 5, wherein the gasket in the sealed position is biased against the first component that is secured by the fastener to the second component when the fastener is in the secured position.

7. The fastening assembly of claim 1, further comprising a boss of the washer that is received within an aperture of the first component.

8. The fastening assembly of claim 7, further comprising a primary portion of the washer secured directly to the gasket, the boss extending from the primary portion.

9. The fastening assembly of claim 7, further comprising a boss of the second component received within the aperture of the first component and directly contacting the boss of the washer.

10. The fastening assembly of claim 7, further comprising a plurality of radially extending fingers of the second component, the plurality of radially extending fingers clamped between the washer and the first component.

11. A fastening assembly, comprising:
a washer having a washer bore to receive a shank of a fastener;
a gasket secured about a radially outer perimeter of the washer, the gasket having an opening that is larger than a head of the fastener such that the gasket is spaced radially from the fastener when the shank is received within the washer bore; and a fan assembly configured to move a flow of air through a battery pack of an electrified vehicle, the fan assembly including a housing assembly and a plurality of internal components housed within the interior, wherein the fastener is in a secured position that secures a first component of the housing assembly to at least one of the plurality of internal components.

12. The fastening assembly of claim 11, wherein the at least one of the internal components is a printed circuit board of a fan motor.

13. A fastening method, comprising:

pulling a gasket of a fastening device against a first component when securing the first component to a second component without clamping the gasket, the first component part of a housing assembly of a fan assembly, the second component an internal component housed within an interior of the housing assembly.

14. The fastening method of claim 13, further comprising clamping a washer of the fastening device against at least one of the first or the second component during the pulling.

15. The fastening method of claim 13, further comprising pulling the gasket by clamping a washer of the fastening device between a fastener and the first component.

16. The fastening method of claim 13, further comprising securing the first component to the second component with a fastener extending through a bore in a washer, the gasket overmolded onto the washer.

17. The fastening method of claim 13, further comprising moving a flow of air through a battery pack of an electrified vehicle using the fan assembly.

18. A fastening method, comprising:

pulling a gasket of a fastening device against a first component when securing the first component to a second component without clamping the gasket, and compressing an overmolded portion of the first component during the securing.

* * * * *